(12) United States Patent
Mathew et al.

(10) Patent No.: US 12,497,681 B2
(45) Date of Patent: Dec. 16, 2025

(54) COATINGS AND COATED COMPONENT

(71) Applicant: General Electric Company, Schenectady, NY (US)

(72) Inventors: Paul Mathew, Bangalore (IN); Ravindra Shankar Ganiger, Bangalore (IN); Mohandas Nayak, Bangalore (IN); Mandyam Rangayan Sridhar, Bangalore (IN); Sathisha Chikkabikkodu Hanum, Bangalore (IN); Sharad Pundlik Patil, Bangalore (IN); Harsha K A, Bangalore (IN)

(73) Assignee: General Electric Company, Evendale, OH (US)

( * ) Notice: Subject to any disclaimer, the term of this patent is extended or adjusted under 35 U.S.C. 154(b) by 224 days.

(21) Appl. No.: 18/323,495

(22) Filed: May 25, 2023

(65) Prior Publication Data

US 2024/0287667 A1   Aug. 29, 2024

(30) Foreign Application Priority Data

Feb. 22, 2023  (IN) .............................. 202311012037

(51) Int. Cl.
*C23C 4/067* (2016.01)
*F02B 3/06* (2006.01)

(52) U.S. Cl.
CPC ................ *C23C 4/067* (2016.01); *F02B 3/06* (2013.01)

(58) Field of Classification Search
None
See application file for complete search history.

(56) References Cited

U.S. PATENT DOCUMENTS

| | | |
|---|---|---|
| 3,286,737 A | 11/1966 | Kelly, Jr. |
| 3,479,289 A | 11/1969 | Van Wyk |
| 3,497,376 A | 2/1970 | Wieser |
| 3,637,497 A | 1/1972 | Fitz Simmons |
| 3,837,497 A | 9/1974 | Smith |
| 4,414,241 A | 11/1983 | Quella et al. |
| 5,230,815 A | 7/1993 | Rountree |
| 6,170,156 B1 | 1/2001 | Lev et al. |

(Continued)

FOREIGN PATENT DOCUMENTS

| | | |
|---|---|---|
| CN | 102348887 A | 2/2012 |
| CN | 102994947 B | 12/2014 |

(Continued)

OTHER PUBLICATIONS

Burtch, Engineering Precisely Controlled Negative and Zero Thermal Expansion Behaviors in Metal-Organic Frameworks, SAND2019-10497, Sandia National Laboratories, 2019, 31 Pages. Retrieved from: https://www.osti.gov/servlets/purl/1561441.

(Continued)

*Primary Examiner* — Daniel J. Schleis
(74) *Attorney, Agent, or Firm* — Dority & Manning, P.A.

(57) ABSTRACT

A coated component includes a component having a surface, and a solid lubricant wear resistant coating on the surface, wherein the solid lubricant wear resistant coating includes a solid lubricant phase with a negative thermal expansion coefficient material dispersed therein. The component may also include a coating having oleophilic or porous properties disposed on portions thereof, and a coating having oleophobic properties disposed on portions thereof.

19 Claims, 6 Drawing Sheets

(56) References Cited

U.S. PATENT DOCUMENTS

| | | |
|---|---|---|
| 6,180,574 B1 | 1/2001 | Ryan et al. |
| 6,183,716 B1 | 2/2001 | Sleight et al. |
| 6,432,022 B1 | 8/2002 | Bayer |
| 6,513,986 B2 | 2/2003 | Ito et al. |
| 6,977,096 B2 | 12/2005 | LeClaire |
| 8,530,051 B2 | 9/2013 | Yamaguchi et al. |
| 8,904,642 B2 | 12/2014 | Hanna et al. |
| 9,029,302 B2 | 5/2015 | Kamiya et al. |
| 9,366,333 B2 | 6/2016 | Tsuda et al. |
| 9,625,332 B2 | 4/2017 | Saito et al. |
| 10,253,817 B2 | 4/2019 | Plogmann et al. |
| 10,578,169 B2 | 3/2020 | Pritchard |
| 10,641,332 B2 | 5/2020 | Nonato de Paula et al. |
| 2002/0151406 A1 | 10/2002 | Williams |
| 2007/0082547 A1 | 4/2007 | Komoto et al. |
| 2010/0297440 A1 | 11/2010 | Noll |
| 2017/0015932 A1 | 1/2017 | Kool et al. |
| 2018/0372151 A1 | 12/2018 | Sridhar et al. |
| 2021/0060669 A1 | 3/2021 | Stinnett |

FOREIGN PATENT DOCUMENTS

| | | | |
|---|---|---|---|
| CN | 110038776 A | 7/2019 | |
| CN | 112662334 A * | 4/2021 | |
| DE | 19625892 A1 * | 1/1997 | F16H 55/06 |
| DE | 10215881 A1 | 10/2003 | |
| DE | 102004051289 A1 | 5/2006 | |
| DE | 102006015997 A1 | 10/2007 | |
| DE | 102013211590 A1 | 12/2014 | |
| DE | 102019001018 | 8/2020 | |
| JP | 2000002315 A | 1/2000 | |
| JP | 2005007912 A | 1/2005 | |
| JP | 2007291466 A | 11/2007 | |
| JP | 2019007059 A | 1/2019 | |
| KR | 101627208 A | 12/2015 | |
| WO | WO201820976 A1 | 2/2018 | |

OTHER PUBLICATIONS

Dedova et al., Structure and Thermal Behavior of Zirconium Tungstate Under Heating, IOP Conference Series Materials Science and Engineering, vol. 140, 2016, 8 Pages. Retrieved from: https://www.researchgate.net/publication/306007651_Structure_and_thermal_behavior_of_zirconium_tungstate_under_heating.

Liebendorfer, Molybdenum Lowers Negative Thermal Expansion of Zirconium Vandate to Room Temperature, AIP Scilight, May 2020, 6 Pages. Retrieved from: bttps://aip.scitation.org/doi/10.1063/10.0001254.

McCreary et al., Substrate Sensitivity of Monolayer WS2 Naval Research Laboratory, Washington, DC, 29 Pages. Retrieved from: https://arxiv.org/ftp/arxiv/papers/1610/1610.06813.pdf.

Raza et al., Structural, Fatigue Behavior, and Mechanical Properties of Zirconium Tungstate-Reinforced Casted A356 Aluminum Alloy, Metals 2020, vol. 10, Issue 11, 1492, 15 Pages. https://www.mdpi.com/2075-4701/10/11/1492/htm.

Wikiversity, Gears, 4 Pages. Retrieved Dec. 7, 2021 from https://en.wikiversity.org/wiki/Gears.

Zhang et al., Thermal Expansion Coefficient of Monolayer Molybdenum Disulfide Using Micro-Raman Spectroscopy, Nano Lett, vol. 19, Issue 7, Jul. 10, 2019, pp. 4745-4751. (Abstract Only) Retrieved from https://pubmed.ncbi.nlm.nih.gov/31184905/.

Qi et al., "Thermal expansion control of composite coatings on 42CrMo by laser cladding", Surface & Coatings Technology, China, 2020, 9 Pages.

Bouabibsa et al., "Structure, Mechanical and Tribological Properties of Me-Doper Diamond-Like Carbon (DLC) (Me=Al, Ti, or Nb) Hydrogenated Amorphous Carbon Coatings", Coatings, vol. 8, No. 10, Oct. 19, 2018, p. 370.

Brzezinka et al., DLC and DLC-WS2 Coatings for Machining of Aluminum Alloys, MDPI Journal Coatings, vol. 9, No. 3, 2019, p. 192. https://www.mdpi.com/2079-6412/9/3/192 https://doi.org/10.3390/coatings9030192.

Coatings Technologies, DLC Coating, Diamond-Like Carbon Coating, CeraTough™-D, Diamond-Like Carbon (DLC). Retrieved Aug. 31, 2021 from web page: https://www.ibccoatings.com/dlc-coating-diamond-like-carbon-coating-ceratough-d.

SKF, The Potential of Surface Refinement, Rolling Bearings. Retrieved Aug. 31, 2021 from web page: https://www.skf.com/uk/products/rolling-bearings/coatings.

Theiler et al., Friction and Endurance of $MoS_2$/ta-C Coatings Produced by Laser Arc Deposition, ScienceDirect Wear, vol. 297, Issues-1-2, Jan. 15, 2013, pp. 791-801. https://www.sciencedirect.com/science/article/abs/pil/S004316481200316X https://doi.org/10.1016/j.wear.2012.10.007.

\* cited by examiner

COATINGS AND COATED COMPONENT

PRIORITY INFORMATION

The present application claims priority to Indian Patent Application Serial Number 202311012037 filed on Feb. 22, 2023.

FIELD OF TECHNOLOGY

This disclosure broadly relates to coatings for surfaces of a component. In particular, the coatings may be a solid lubricant wear resistant coating particularly suitable for surfaces subject to high stress and coatings having oleophobic, oleophilic, and porous properties for lubrication efficiency.

BACKGROUND

At least some gas turbine engines, such as turbofan engines, include a fan, a core engine, and a power turbine. The core engine includes at least one compressor, a combustor, and a high-pressure turbine coupled together in a serial flow relationship. More specifically, the compressor and high-pressure turbine are coupled through a first drive shaft to form a high-pressure rotor assembly. Air entering the core engine is mixed with fuel and ignited to form a high energy gas stream. The high energy gas stream flows through the high-pressure turbine to rotatably drive the high-pressure turbine such that the first drive shaft rotatably drives the compressor. The gas stream expands as it flows through a low-pressure turbine positioned aft of the high-pressure turbine. The low-pressure turbine includes a rotor assembly having a fan coupled to a second drive shaft. The low-pressure turbine rotatably drives the fan through the second drive shaft.

The drive shafts in the turbine engine are typically supported by one or more bearings, and at least some turbofans include a speed-reducing gearbox coupled along the drive shaft between the low-pressure turbine and the fan. The gearbox facilitates decoupling the fan tip speed from the speed of the low-pressure turbine. For example, at least some known gearboxes include a sun gear engaged with and rotatably mounted radially inward relative to a plurality of planetary gears. The planetary gears each include a roller bearing cage having a plurality of roller elements therein. In operation, the planetary gears sometimes rotate circumferentially about the sun gear, and also rotate about an axis.

BRIEF DESCRIPTION OF THE DRAWINGS

A full and enabling disclosure of the present invention, including the best mode thereof, directed to one of ordinary skill in the art, is set forth in the specification, which makes reference to the appended FIGS., in which.

Figure 1:
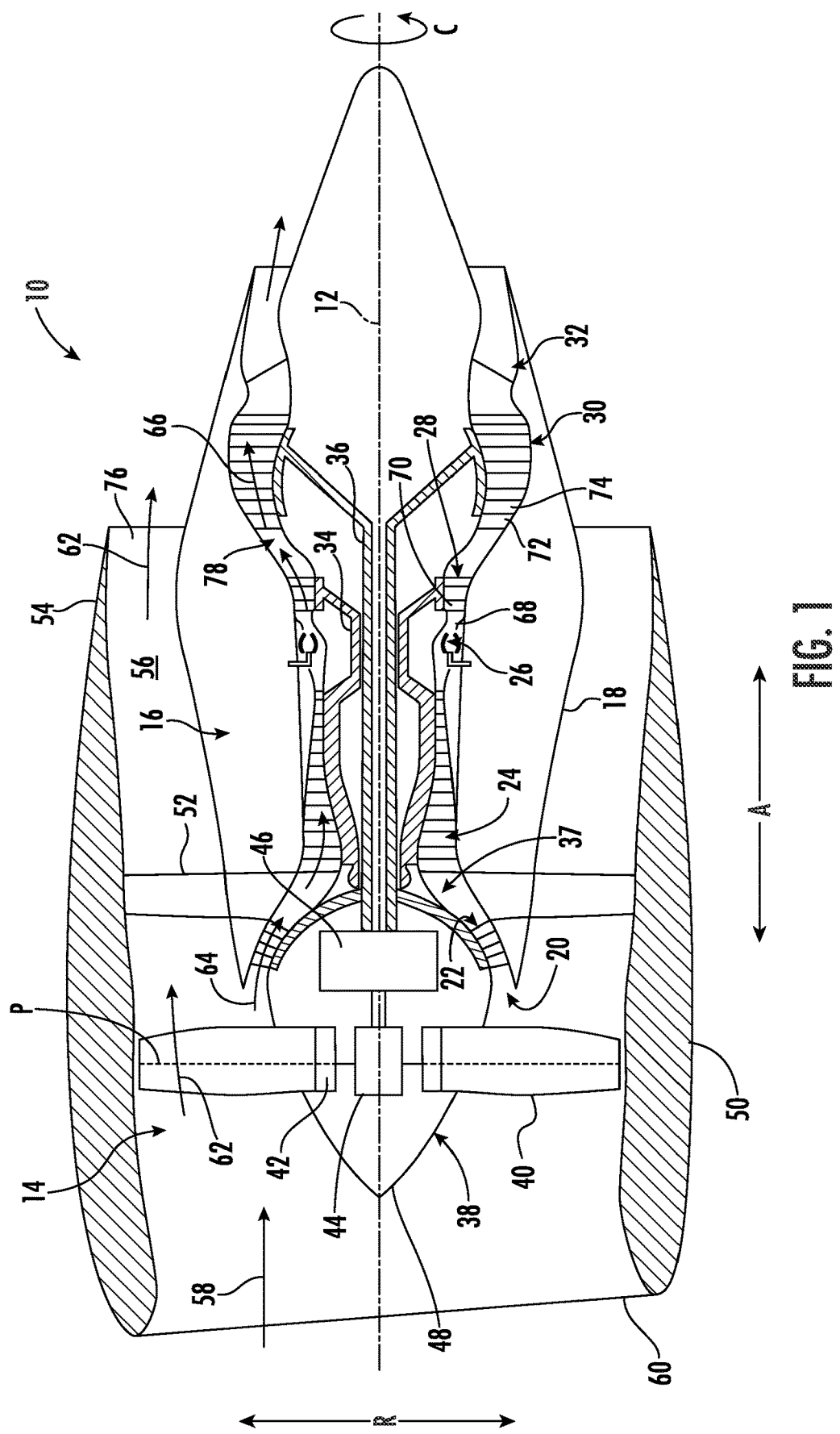
FIG. 1 is a schematic illustration of an exemplary turbine engine.

Repeat use of reference characters in the present specification and drawings is intended to represent the same or analogous features or elements of the present disclosure.

DETAILED DESCRIPTION

Reference now will be made in detail to embodiments of the present disclosure, one or more examples of which are illustrated in the drawings. Each example is provided by way of explanation of the invention, not limitation of the invention. In fact, it will be apparent to those skilled in the art that various modifications and variations can be made without departing from the scope of the invention. For instance, features illustrated or described as part of one embodiment can be used with another embodiment to yield a still further embodiment. Thus, it is intended that the present disclosure covers such modifications and variations as come within the scope of the appended claims and their equivalents.

In the following specification and the claims, reference will be made to a number of terms, which shall be defined to have the following meanings.

As used herein, the word "exemplary" is means "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

As used herein, the terms "first", "second", and "third" may be used interchangeably to distinguish one component from another and are not intended to signify location or importance of the individual components.

The term "turbomachine" or "turbomachinery" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" of the engine.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the terms "axial" and "axially" refer to directions and orientations that extend substantially parallel to a centerline of the turbine engine or the roller bearing cage. Moreover, the terms "radial" and "radially" refer to directions and orientations that extend substantially perpendicular to the centerline of the turbine engine or the roller bearing cage. In addition, as used herein, the terms "circumferential" and "circumferentially" refer to directions and orientations that extend arcuately about the centerline of the turbine engine or the roller bearing cage.

In the present disclosure, when a layer is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth.

As used herein, the term "polymer" generally includes, but is not limited to, homopolymers; copolymers, such as, for example, block, graft, random and alternating copolymers; and terpolymers; and blends and modifications thereof. Furthermore, unless otherwise specifically limited, the term "polymer" shall include all possible geometrical configurations of the material. These configurations include, but are not limited to isotactic, syndiotactic, and random symmetries.

As used herein, the term "substantially free" is understood to mean completely free of said constituent, or inclusive of trace amounts of same. "Trace amounts" are those quantitative levels of chemical constituent that are barely detectable and provide no benefit to the functional or aesthetic properties of the subject composition. The term "substantially free" also encompasses completely free.

As used herein, the term "substantially equal" is understood to be inclusive of a minor trace variation of a quantitative level that is barely detectable and provides no benefit to the functional or aesthetic properties of the subject composition. The term "substantially equal" also encompasses completely equal.

As used herein, "substantially" refers to at least about 99% or more of the described group. For instance, as used herein, "substantially all" indicates that at least about 99% or more of the respective group have the applicable trait and "substantially no" or "substantially none" indicates that at least about 99% or more of the respective group do not have the applicable trait.

As used herein, the term "aspect ratio" of a particle refers to the length of the largest caliper diameter of the particle divided by the length of the smallest caliper diameter of that same particle. For example, a circular particle would have an equal length all around the particle, and thus would have an aspect ratio of 1. In another example, a microparticle having a caliper diameter in its largest dimension of 100 micrometers (μm) and a caliper diameter in its smallest dimension of 10 μm would have an aspect ratio of 10 (i.e., 100 μm divided by 10 μm is 10). It is noted that the aspect ratio is agnostic to measurement units, as the formula cancels out the particular units utilized to measure the length, as long as the measuring units are the same.

In certain aspects of the present disclosure, a solid lubricant wear resistant coating is provided for enhanced durability and performance of components generally exposed to high stress (e.g., >0.75 GPa). Components generally exposed to these conditions experience high friction, increased contact temperatures, surface finish deterioration, excessive wear, micro pitting, and crack formation. An example of such components may be gears, bearings, and bearing cages; however, it should be understood that other types of components may experience similar operational characteristics. In some embodiments of the present disclosure, a coating having lubricating properties with a negative thermal expansion coefficient material dispersed therein for wear resistance is provided that may be applied to various surfaces of certain components, such as by way of non-limiting example, gear-related components. For example, as the contact stress on the gear-related component increases, the flash temperature increases which would in turn result in contraction of a coating. In embodiments of the present disclosure, the contact stress applied on the coating gets regulated, which thereby enables the coating of the present disclosure to be both wear resistant and lubricious. Additionally, in some embodiments, coatings having oleophilic or porous properties are applied on load bearing areas according to the present disclosure which retain a certain quantity of lubricant. Under pressure, the oleophilic and porous coatings of the present disclosure get squeezed to release the lubricant into the contact zone. Once the coating exits the contact zone, it begins to relax and during this process, the lubricant gets absorbed back into the coating layer. Additionally, in some embodiments, coatings having oleophobic properties are applied to certain surfaces of the components according to the present disclosure to conserve lubricant consumption. Accordingly, embodiments of the present disclosure provide increased performance under starved lubrication and under higher temperature rise and improved resistance to the presence of particles in lubrication sumps due to the presence of coatings.

Referring now to the drawings, wherein identical numerals indicate the same elements throughout the figures, FIG. 1 is a schematic cross-sectional view of a gas turbine engine 10 in accordance with an exemplary embodiment of the present disclosure. More particularly, for the embodiment of FIG. 1, the gas turbine engine 10 is a high-bypass turbofan jet engine, sometimes also referred to as a "turbofan engine." As shown in FIG. 1, the gas turbine engine 10 defines an axial direction A (extending parallel to a longitudinal centerline 12 provided for reference), a radial direction R, and a circumferential direction C extending about the longitudinal centerline 12. In general, the gas turbine engine 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft 34 (which may additionally or alternatively be a spool) drivingly connects the HP turbine 28 to the HP compressor 24. A low pressure (LP) shaft 36 (which may additionally or alternatively be a spool) drivingly connects the LP turbine 30 to the LP compressor 22. The compressor section, combustion section 26, turbine section, and jet exhaust nozzle section 32 together define a working gas flowpath 37.

For the embodiment depicted, the fan section 14 includes a fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable pitch change mechanism 44 configured to collectively vary the pitch of the fan blades 40, e.g., in unison. The gas turbine engine 10 further includes a power gearbox 46, and the fan blades 40, disk 42, and pitch change mechanism 44 are together rotatable about the longitudinal centerline 12 by LP shaft 36 across the power gearbox 46. The power gearbox 46 includes a plurality of gears for adjusting a rotational speed of the fan 38 relative to a rotational speed of the LP shaft 36, such that the fan 38 may rotate at a more efficient fan speed.

Referring still to the exemplary embodiment of FIG. 1, the disk 42 is covered by rotatable front hub 48 of the fan section 14 (sometimes also referred to as a "spinner"). The front hub 48 aerodynamically contoured to promote an airflow through the plurality of fan blades 40.

Additionally, the exemplary fan section 14 includes an annular fan casing or outer nacelle 50 that circumferentially surrounds the fan 38 and/or at least a portion of the turbomachine 16. It should be appreciated that the nacelle 50 is supported relative to the turbomachine 16 by a plurality of circumferentially-spaced outlet guide vanes 52 in the embodiment depicted. Moreover, a downstream section 54 of the nacelle 50 extends over an outer portion of the turbomachine 16 so as to define a bypass airflow passage 56 therebetween.

During operation of the gas turbine engine 10, a volume of air 58 enters the gas turbine engine 10 through an associated inlet 60 of the nacelle 50 and fan section 14. As the volume of air 58 passes across the fan blades 40, a first portion of air 62 is directed or routed into the bypass airflow passage 56 and a second portion of air 64 as indicated by arrow 64 is directed or routed into the working gas flowpath 37, or more specifically into the LP compressor 22. The ratio between the first portion of air 62 and the second portion of air 64 is commonly known as a bypass ratio. A pressure of the second portion of air 64 is then increased as it is routed through the HP compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft 34, thus causing the HP shaft 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus causing the LP shaft 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the gas turbine engine 10, also providing propulsive thrust. The HP turbine 28, the LP turbine 30, and the jet exhaust nozzle section 32 at least partially define a hot gas path 78 for routing the combustion gases 66 through the turbomachine 16.

It should be appreciated, however, that the exemplary gas turbine engine 10 depicted in FIG. 1 is by way of example only, and that in other exemplary embodiments, the gas turbine engine 10 may have any other suitable configuration. For example, although the gas turbine engine 10 depicted is configured as a ducted gas turbine engine (i.e., including the outer nacelle 50), in other embodiments, the gas turbine engine 10 may be an unducted gas turbine engine (such that the fan 38 is an unducted fan, and the outlet guide vanes 52 are cantilevered from the outer casing 18). Additionally, or alternatively, although the gas turbine engine 10 depicted is configured as a geared gas turbine engine (i.e., including the power gearbox 46) and a variable pitch gas turbine engine (i.e., including a fan 38 configured as a variable pitch fan), in other embodiments, the gas turbine engine 10 may additionally or alternatively be configured as a direct drive gas turbine engine (such that the LP shaft 36 rotates at the same speed as the fan 38), as a fixed pitch gas turbine engine (such that the fan 38 includes fan blades 40 that are not rotatable about a pitch axis P), or both. It should also be appreciated, that in still other exemplary embodiments, aspects of the present disclosure may be incorporated into any other suitable gas turbine engine. For example, in other exemplary embodiments, aspects of the present disclosure may (as appropriate) be incorporated into, e.g., a turboprop gas turbine engine, a turboshaft gas turbine engine, or a turbojet gas turbine engine.

Figure 2:
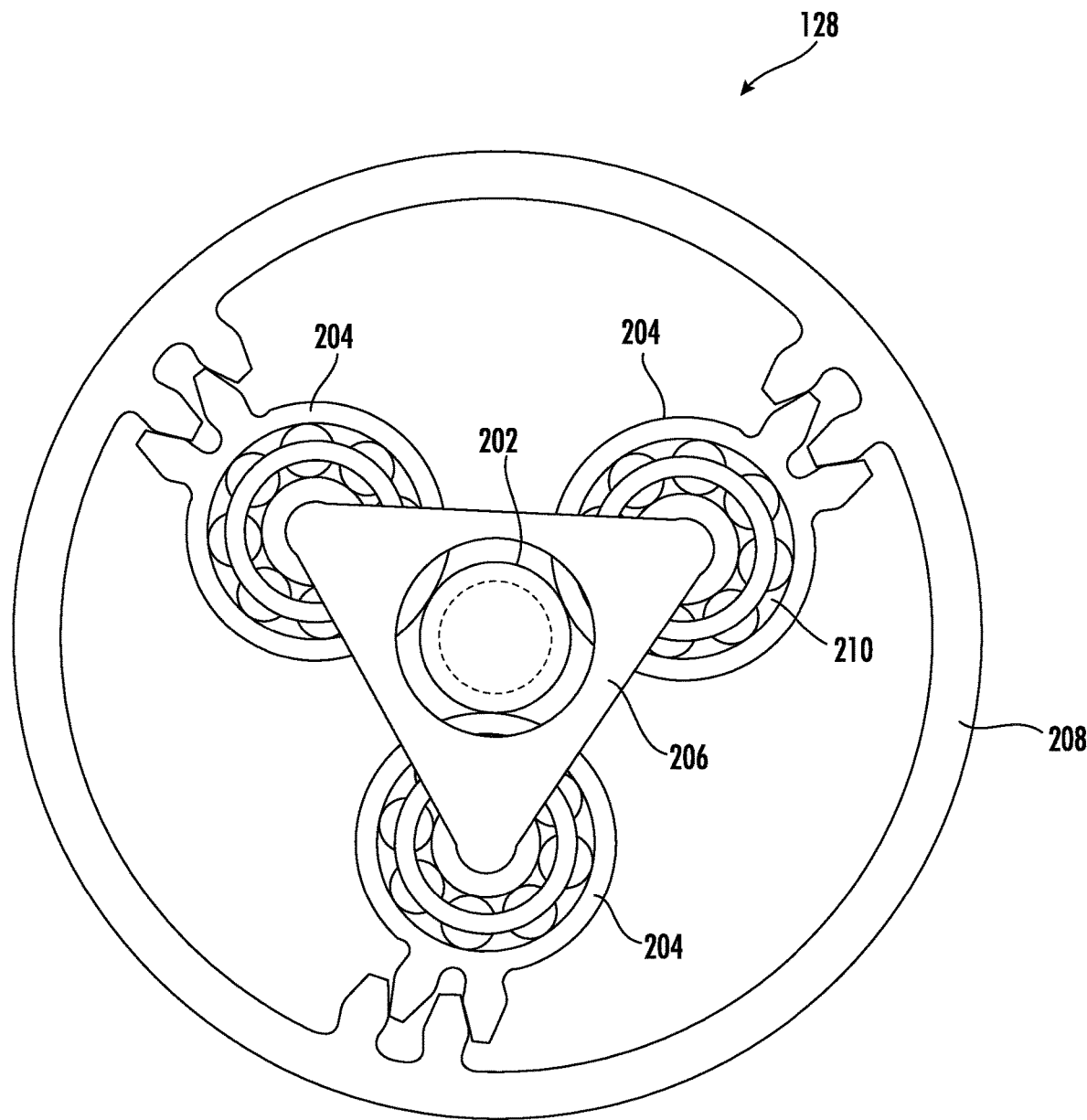
FIG. 2 is a schematic end view of an exemplary power gearbox that may be used in the turbine engine shown in FIG. 1.

As indicated above, embodiments of the present disclosure provide a coating having lubricating properties with a negative thermal expansion coefficient property that may be applied to various surfaces of certain components. Additionally, embodiments of the present disclosure apply coatings with porous, oleophobic, or oleophilic properties to certain surfaces of the component for lubrication efficiency. Application of such coatings will be described below in an exemplary gearbox application. However, it should be understood that the coatings and applications thereof according to the present disclosure may be used for other components of the gas turbine engine 10 (FIG. 1) or other components of other types of machinery. Accordingly, FIG. 2 is a schematic end view of a power gearbox 46 that may be used in the gas turbine engine 10 (FIG. 1). In the exemplary embodiment, the power gearbox 46 includes a least one sun or central gear 202, and a plurality of planetary gears 204 that are each rotatably coupled to the central gear 202. The power gearbox 46 further includes a carrier member 206 coupled to the plurality of planetary gears 204. The plurality of planetary gears 204 are positioned circumferentially about the central gear 202 and are meshed with the central gear 202 (gear teeth partially or completely omitted). The planetary gears 204 are positioned in and meshed within a ring gear or an annular gear 208 (gear teeth partially or completely omitted). In the exemplary embodiment, the annular gear 208 is fixed, and the central gear 202 is driven and in turn drives the planetary gears 204. The planetary gears 204 rotate about the central gear 202, and in turn drive the carrier member 206 rotationally about a centerline axis passing through the center of the central gear 202. In an alternative embodiment, carrier element 206 is fixed, and planetary gears 204 do not rotate about the centerline axis passing through the center of central gear 202. Central gear 202 is driven and drives planetary gears 204. Planetary gears 204 drive annular gear 208. In all embodiments, as described above, central gear 202 and planetary gears 204 cooperate to produce differential input and output speeds for different portions of the gas turbine engine 10 (FIG. 1).

In the exemplary embodiment, each planetary gear 204 includes a bearing assembly 210. The bearing assembly 210 operates to facilitate rotating of the planetary gears 204 with respect to the carrier member 206 and to facilitate rotating of the planetary gears 204 about the central gear 202. In alternative embodiments, as described above, the carrier member 206 is fixed, and the bearing assembly 210 operates to facilitate rotating of the planetary gears in the carrier member 206, but the planetary gears 204 do not rotate about the central gear 202.

Figure 3:
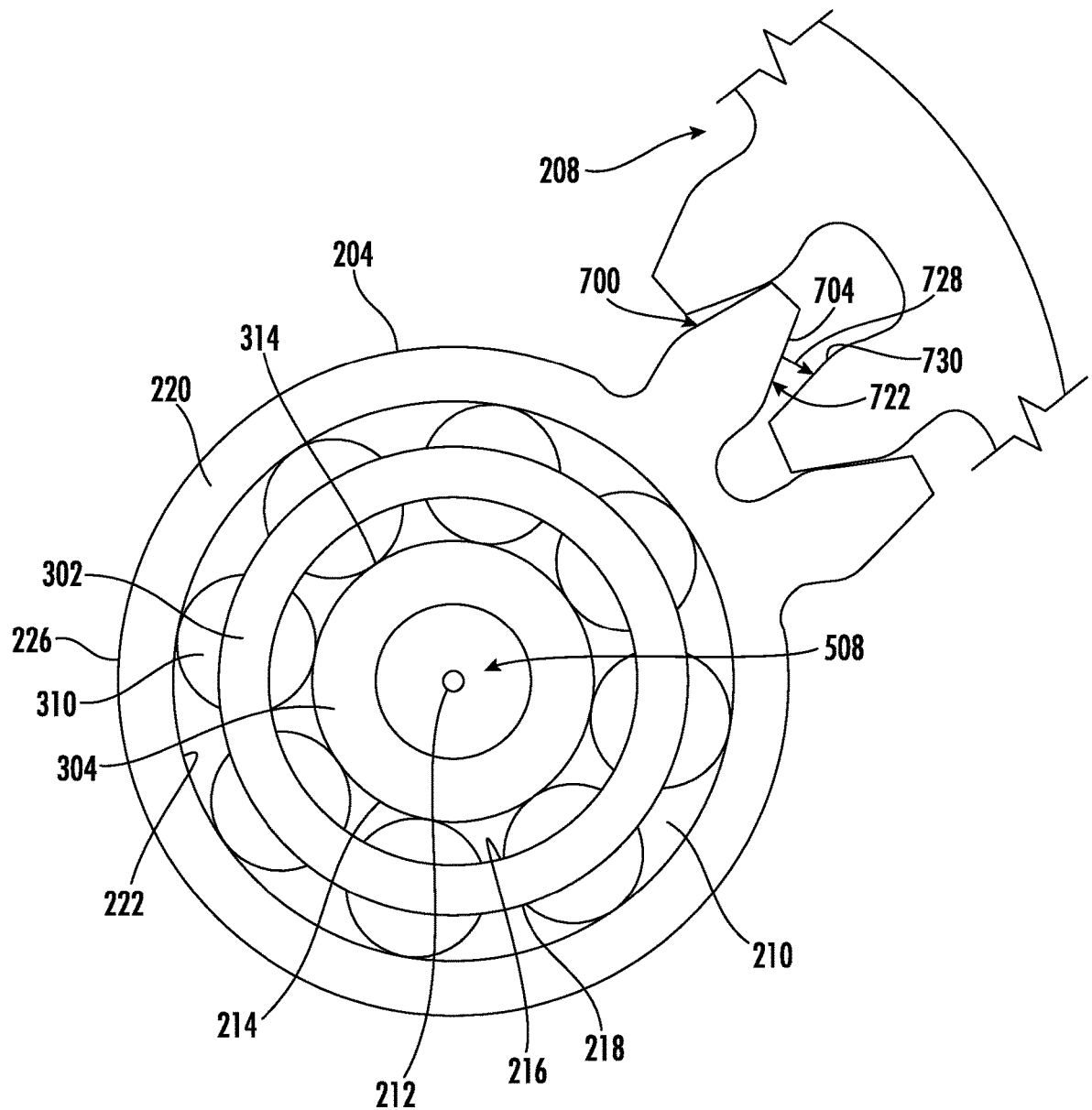
FIG. 3 is a schematic end view of an exemplary planetary gear that may be used in the power gearbox shown in FIG. 2.

FIG. 3 is a schematic end view of a planetary gear 204 including a bearing assembly 210. The planetary gear 204 is positioned in, and meshed with, the annular gear 208 (the annular gear 208 is partially omitted). The bearing assembly 210 includes a center 212 coupled to the carrier element 206 (FIG. 2). The bearing assembly 210 further includes a longitudinal centerline 508 that extends axially through the center 212. The bearing assembly 210 further includes an inner ring 304 having an outer surface 214. The bearing assembly 210 further includes a roller bearing cage 302 having an inner surface 216 and an outer surface 218. The bearing assembly 210 further includes an outer ring 220 having an inner surface 222 and an outer surface 226. The inner surface 216 is in opposition to the outer surface 214, while the outer surface 218 is in opposition to the inner surface 222. Rollers 310 reside within the roller bearing cage 302.

Figure 4:
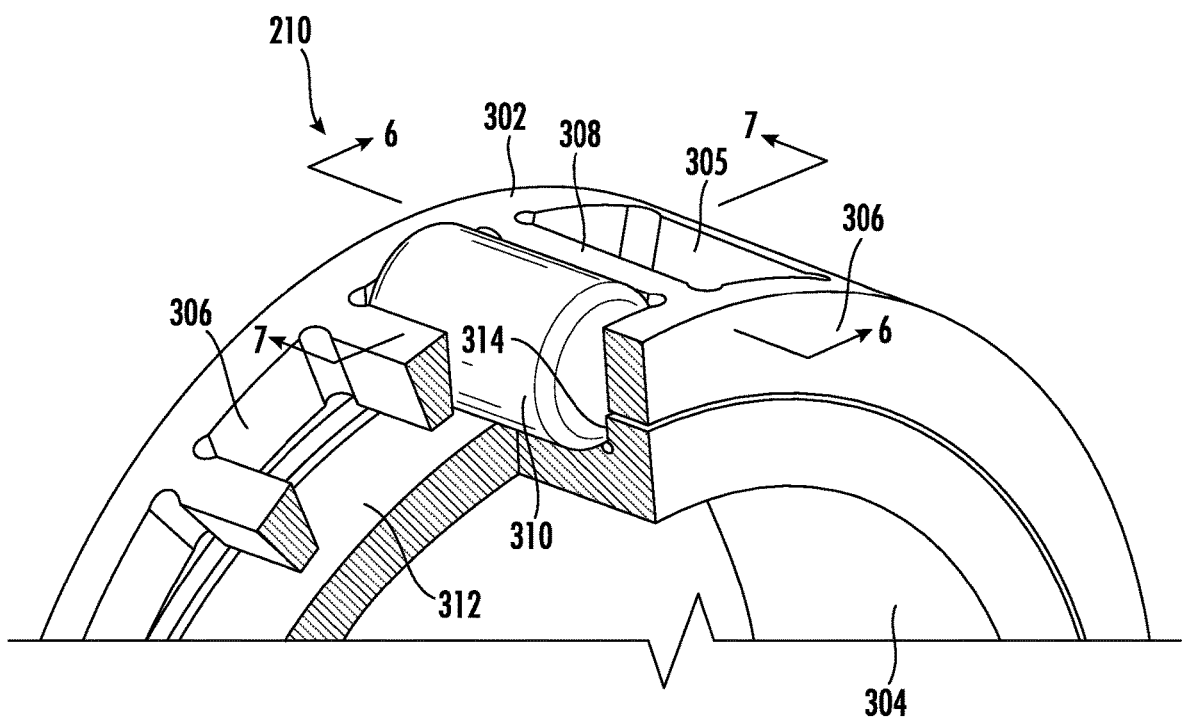
FIG. 4 is a schematic perspective partially cut view of an exemplary roller bearing cage and inner ring that may be used in the power gearbox shown in FIG. 2.

FIG. 4 is a schematic perspective partially cut view of the bearing assembly 210 including the roller bearing cage 302 and the inner ring 304 used in power gearbox 46 (FIG. 2) with the outer ring 220 omitted from view in FIG. 4 for ease of description and illustration of various features of the inner ring 304 and the bearing cage 302. The roller bearing cage 302 includes a plurality of openings 305. The roller bearing cage 302 includes a pair of circumferential side rails 306 and a plurality of web members 308 extending between the side rails 306. The side rails 306 and web members 308 define openings 305. The openings 305 each contain a roller 310 (additional rollers 310 omitted for clarity). The rollers 310 are free to rotate within the openings 305. The roller bearing cage 302 positions the rollers 310 relative to the inner ring 304 (and the outer ring 220 (FIG. 6)). The roller bearing cage 302 guides and separates the rollers 310 from each other during operation to provide for rotation of the outer ring 220 (FIGS. 3 and 6), disposed at least partially around the roller bearing cage 302, relative to the inner ring 304.

Figure 6:
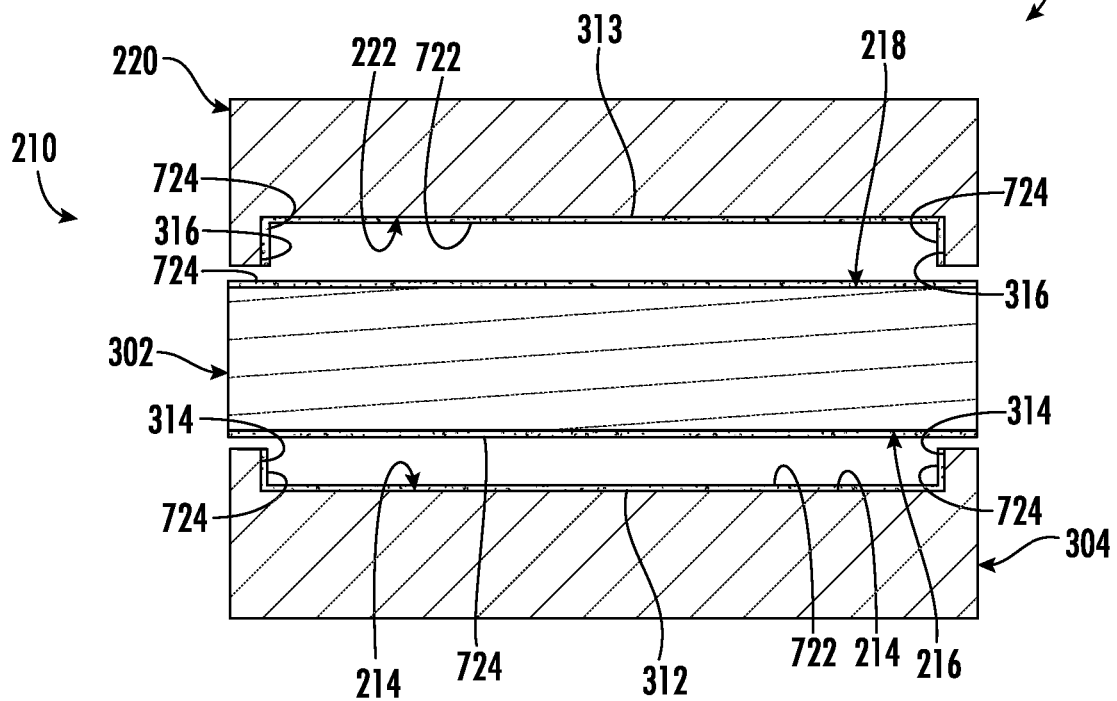
FIG. 6 shows a schematic partial cross-sectional view of the exemplary planetary gear of FIG. 4 taken along the line 6-6 of FIG. 4.

The inner ring 304 has a diameter less than that of the roller bearing cage 302 and is disposed within the roller bearing cage 302. The roller bearing cage 302 positions the rollers 310 at least partially within the inner ring 304. Referring also to FIG. 6, FIG. 6 shows a schematic partial cross-sectional view of an exemplary planetary gear, such as the exemplary planetary gear 204 of FIGS. 3 and 4, taken along the line 6-6 of FIG. 4 (with the outer ring 220 depicted in FIG. 6). The rollers 310 (omitted from view in FIG. 6) contact an inner race 312 of the inner ring 304 and an inner race 313 (FIG. 6) of the outer ring 220 (FIG. 6) and travel within a pair of outwardly extending shoulders 314 of the inner ring 304 disposed on opposite sides of the rollers 310 (only one shown in FIG. 4) and within a pair of inwardly extending shoulders 316 (FIG. 6) of the outer ring 220 (FIG. 6) disposed on opposite sides of the rollers 310. The shoulders 314 and the shoulders 316 (FIG. 6) guide and at least partially support the roller bearing cage 302 as the roller bearing cage 302 rotates relative to the inner ring 304 and the outer ring 220 (FIG. 6). Circumferential side rails 306 of the roller bearing cage 302 form a hydrodynamic bearing with one or more of the shoulders 314 (and with shoulders 316 (FIG. 6) formed on the outer ring 220 (FIG. 6)). This significantly increases the support to the roller bearing cage 302.

The outer ring 220 (FIG. 3) of bearing assembly 210 has a diameter larger than the diameter of inner ring 304. The diameter of the outer ring is also larger than the diameter of roller bearing cage 302. The rollers 310 extend within the outer ring 220 and provide for rotation of the outer ring relative to inner ring 304.

In the exemplary embodiment, the roller bearing cage 302 is metallic. For example, and without limitation, the roller bearing cage 302 is formed as a result of a casting, machining, forging, additive manufacturing, or other metalworking processes. In alternative embodiments, the roller bearing cage 302 is formed from other materials. For example, and without limitation, the roller bearing cage 302 is formed from one or more polymers using one or more techniques such as, without limitation, molding, additive manufacturing, and machining.

Figure 5:
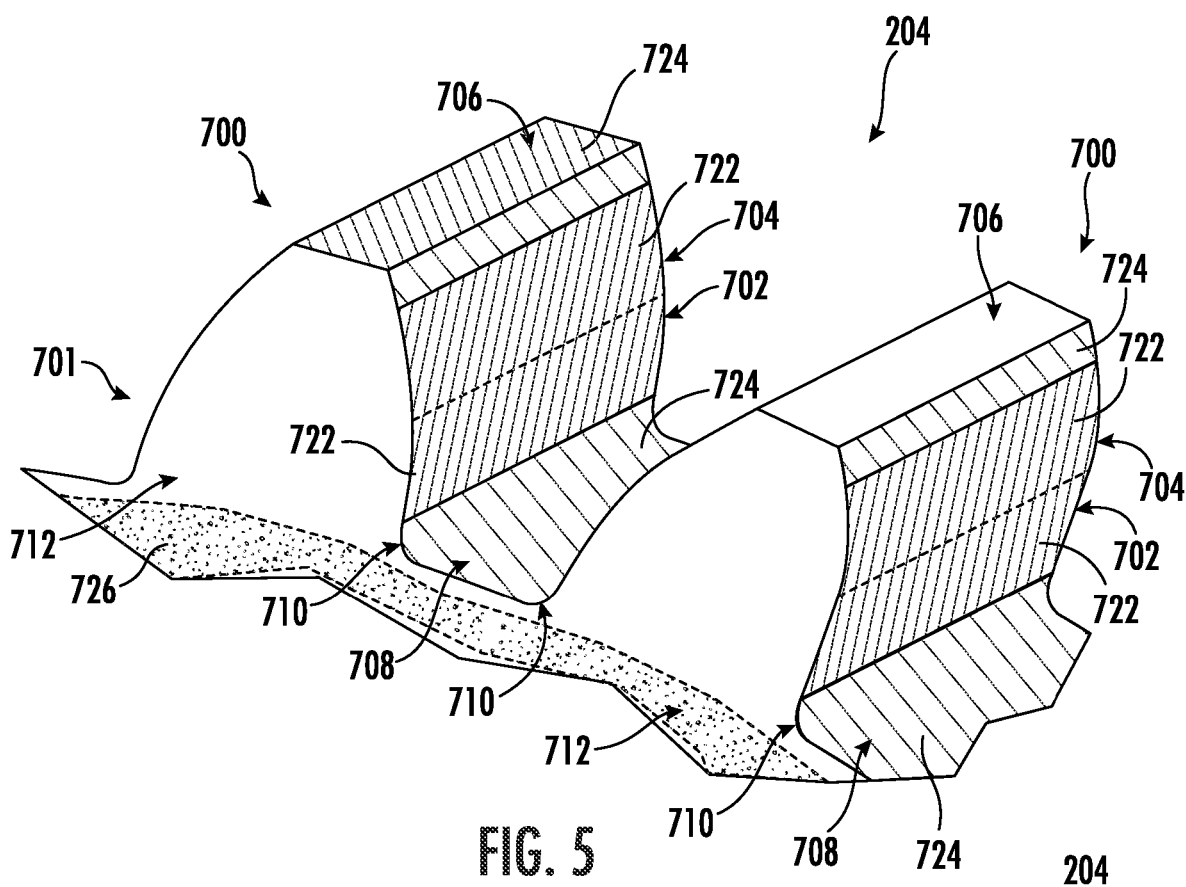
FIG. 5 shows a schematic perspective partial view of exemplary coated gear teeth, such as in the exemplary planetary gear of FIG. 3.

FIG. 5 shows a schematic perspective partial view of exemplary coated gear teeth 700, such as in the exemplary planetary gear 204 of FIG. 3. In the illustrated embodiment, each gear tooth 700 includes a number of different surfaces 701 including a flank surface 702 on each side thereof, which is the working or contacting side/surface of the gear tooth 700 (sometimes referred to as a dedendum flank surface), a face surface 704 on each side thereof, which is the surface of the tooth 700 between a pitch diameter or circle and an outer diameter or circle of the tooth 700 (sometimes referred to as the addendum flank surface), the top land surface 706, which is the top surface of the gear tooth 700, the bottom land surface 708, which is the surface at the bottom of the space between adjacent teeth 700, and the root fillet surface 710, which is the rounded surface portion at the base of the gear tooth 700 between the flank surface 702 and the bottom land surface 708. In FIG. 5, the planetary gear 204 also includes an end face surface 712 on each side of the planetary gear 204, which is a lateral or side surface of the planetary gear 204.

In FIG. 5, the flank surface 702 and face surface 704 of the gear tooth 700 include a solid lubricant wear resistant coating 722 disposed thereon. The solid lubricant wear resistant coating 722 includes a solid lubricant phase with a negative thermal expansion coefficient material dispersed therein to provide wear resistance. For example, as will be described further below, the contraction properties of the negative thermal expansion coefficient material provide wear resistance to the respective coated component surface. In some embodiments, the solid lubricant wear resistant coating 722 is disposed on both working and non-working flank surfaces 702 and face surfaces 704 (e.g., the non-working flank surfaces 702 and face surfaces 704 not participating in conjugate meshing when a gear pair is in operation). However, it should be understood that in some embodiments, the solid lubricant wear resistant coating 722 may disposed on at least one of the working and non-working flank surfaces 702 or face surfaces 704.

In FIG. 5, certain surfaces 701 of the gear tooth 700 include a coating 724 having porous or oleophilic properties, and certain surfaces 701 of the gear tooth 700 include a coating 726 having oleophobic properties. For example, in FIG. 5, the coating 724 having porous or oleophilic properties is disposed on the bottom land surface 708 and, in some embodiments, extends at least partially onto the root fillet surface 710 and adjoining regions of the flank surfaces 702. In the illustrated embodiment, the coating 724 having porous or oleophilic properties is also disposed on a portion of the face surface 704 proximate the top land surface 706 (e.g., load bearing areas or surfaces). The coating 724 having porous or oleophilic properties can absorb a lubricant (e.g., oil) when the gear teeth 700 go through a lubricant sump (not shown). As the gear teeth 700 emerge out of the lubricant sump, lubricant is retained in the pores or on the surface of the coating 724 having porous or oleophilic properties. As the gear teeth 700 mesh or come into contact with teeth of another component or gear (not shown), the lubricant gets released into a contact zone of the gear teeth 700 (i.e., surfaces of the gear teeth 700 contacting surfaces of meshing teeth of another component or gear (not shown)). In some embodiments, the coating 724 having porous or oleophilic properties comprises polydimethylsiloxane (PDMS), polyurethane (PU), graphene oxide (GO) dispersed PU, etc. In some embodiments, the coating 724 having porous or oleophilic properties comprises an aluminosilicate coating, iron doped aluminosilicate (e.g., 30 vol % iron; 70 vol % aluminosilicate), high silica zeolite coatings, etc. In some embodiments, the coating 724 having porous or oleophilic properties comprises graphene oxide (GO), boron nitride, or a mixture thereof. In some embodiments, the coating 724 having porous or oleophilic properties comprises a hexagonal boron nitride coating. In some embodiments, the coating 724 having porous or oleophilic properties comprises carbon nanotubes dispersed within the coating 724.

In the illustrated exemplary embodiment, the coating 726 having oleophobic properties is disposed on the end face surface 712 of the planetary gear 204. For example, in the illustrated embodiment, the coating 726 having oleophobic properties is disposed on a portion of the end face surface 712 extending inward toward the longitudinal centerline 508 (FIG. 3) from the root or dedendum circle/diameter of the planetary gear 204. The coating 726 having oleophobic properties is applied to certain portions of the planetary gear 204 to conserve lubricant consumption. In some embodiments, the coating 726 having oleophobic properties comprises a diamond-like carbon (DLC) coating (e.g., DLC coating functionalized using fluorine based groups including polytetrafluoroethylene (PTFE)), a $SiO_2$ dispersed coating, a PTFE-based coating, or a mixture thereof. In some embodiments, the coating 726 having oleophobic properties has a thickness of 1 μm to 100 μm.

In some embodiments, the solid lubricant wear resistant coating 722 covers at least ninety percent (90%) of the surface area of the flank surface 702 of each tooth 700. In some embodiments, the top land surface 706 of each tooth 700 is substantially free or devoid from the solid lubricant wear resistant coating 722. In some embodiments, the coating 724 having porous or oleophilic properties is disposed on the top land surface 706 of each tooth 700.

Figure 7:
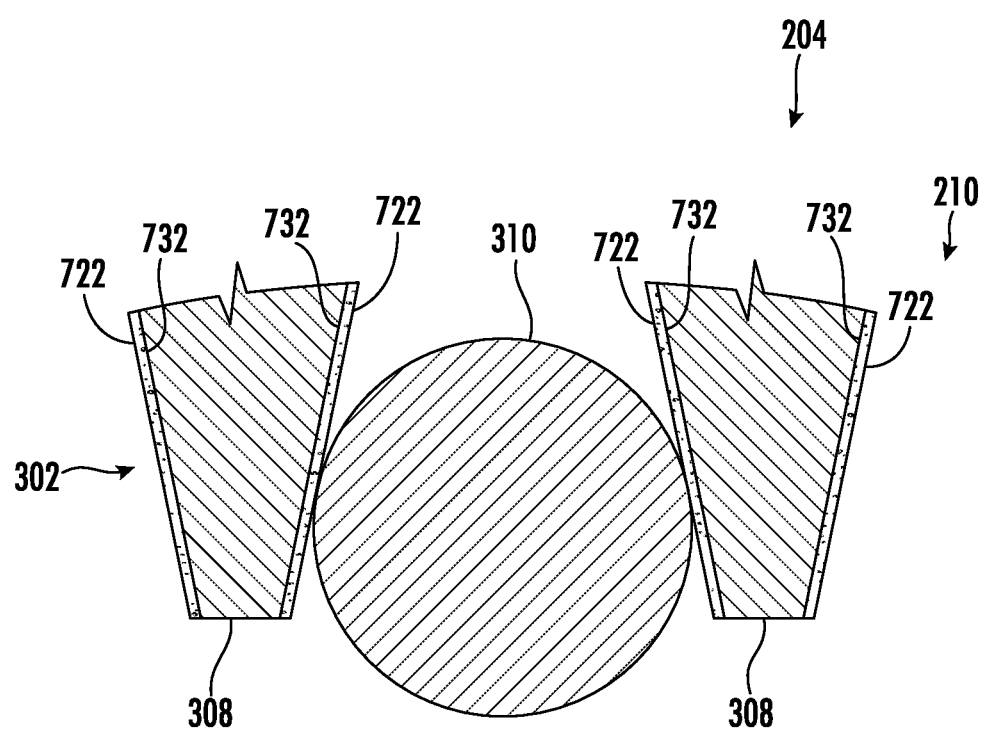
FIG. 7 shows a schematic partial cross-section view of the exemplary planetary gear of FIG. 4 taken along the line 7-7 of FIG. 4.

Referring again to FIG. 6 and to FIG. 7, FIG. 7 shows a schematic partial cross-section view of the exemplary planetary gear 204 of FIGS. 3 and 4 taken along the line 7-7 of FIG. 4. In the illustrated embodiment, the planetary gear 204 includes a bearing assembly 210, such as the exemplary bearing assembly 210 of FIG. 3. In FIGS. 6 and 7, the bearing assembly includes an outer ring 220 having an inner surface 222, a roller bearing cage 302 supporting rollers 310 (only one roller 310 depicted in FIGS. 6 and 7), and an inner ring 304 having an outer surface 214.

In the illustrated embodiment, various components and/or surfaces thereof of the planetary gear 204 and/or bearing assembly 210 include the solid lubricant wear resistant coating 722. For example, in the illustrated embodiment, the solid lubricant wear resistant coating 722 is disposed on at least a portion of the outer ring 220, the inner ring 304, and the roller bearing cage 302. In some embodiments, the solid lubricant wear resistant coating 722 may be disposed on the inner surface 222 of the outer ring 220 and the outer surface 218 of the inner ring 304. Thus, in some embodiments, the solid lubricant wear resistant coating 722 is positioned on the inner surface 222 of the outer ring 220 and the outer surface 214 of the inner ring 304 such that the solid lubricant wear resistant coating 722 contacts the rollers 310.

In some embodiments, the solid lubricant wear resistant coating 722 may be disposed on portions of the roller bearing cage 302 in contact with rollers 310. For example, as best illustrated in FIG. 7, the roller bearing cage 302 includes web members 308 each having surfaces 732 facing and contacting the roller 310. In some embodiments, the solid lubricant wear resistant coating 722 may be disposed on the surfaces 732. Thus, in some embodiments, the solid lubricant wear resistant coating 722 is positioned on surfaces of the roller bearing cage 302 defining the openings 305 (FIG. 4) such that the solid lubricant wear resistant coating 722 is positioned to contact the rollers 310 when the rollers 310 are positioned within the roller bearing cage 310. As best illustrated in FIG. 6, in some embodiments, the coating 724 having porous or oleophilic properties may be disposed on the surfaces of the shoulders 314 and 316 facing towards the rollers 310.

Additionally, in the illustrated embodiment, the coating 724 having porous or oleophilic properties is disposed on at least a portion of the roller bearing cage 302. For example, in some embodiments, the coating 724 having porous or oleophilic properties is disposed on an inner surface 216 of the roller bearing cage 302 and an outer surface 218 of the roller bearing cage 302.

In some embodiments, the solid lubricant wear resistant coating 722 includes a solid lubricant phase. In some embodiments, the solid lubricant phase comprises $WS_2$, $MoS_2$, a diamond-like carbon material, chromium plating, a thin, dense chrome (TDC) coating (TDC having a dense chromium structure, i.e., 99.9% chromium content as opposed to conventional chrome plating which only has 80-88% chromium) or a mixture thereof. In some embodiments, the solid lubricant wear resistant coating 722 is configured to contract 0.005% to 0.1% of its room temperature thickness on the surface of the flank surface 702 at an operating temperature of 300° C. In certain exemplary embodiments, the solid lubricant wear resistant coating 722 has a room temperature thickness of 25 μm to 1000 μm, and has an operating thickness that is 0.001% to 0.064% of the room temperature thickness at an operating temperature of 200° C. In certain exemplary embodiments, the solid lubricant wear resistant coating 722 comprises a compound of the formula:

$$Zr_{1-x}Hf_xW_{2-y}Mo_yO_8$$

where x is 0 to 1 and where y is 0 to 2.

In some exemplary embodiments, the solid lubricant wear resistant coating 722 comprises a compound of the formula:

$$Zr_{1-x}Hf_xW_2Mo_yO_8$$

where x is 0 to 1.

In some exemplary embodiments, the solid lubricant wear resistant coating 722 comprises a compound of the formula:

$$Zr_{1-x}Hf_xMo_2O_8$$

where x is 0 to 1.

In some exemplary embodiments, the solid lubricant wear resistant coating 722 comprises a compound of the formula:

$$ZrW_{2-y}Mo_yO_8$$

$$Zr_{1-x}Hf_xWMoO_8$$

where x is 0 to 1.

In some exemplary embodiments, the solid lubricant wear resistant coating 722 comprises a compound of the formula:

$$ZrW_{2-y}Mo_yO_8$$

where y is 0 to 2.

In some exemplary embodiments, the solid lubricant wear resistant coating 722 comprises a compound of the formula:

$$HfW_{2-y}Mo_yO_8$$

where y is 0 to 2.

In some exemplary embodiments, the solid lubricant wear resistant coating 722 defines a plurality of discrete particles within the solid lubricant wear resistant coating 722. In some embodiments, at least ninety percent (90%) of the plurality of discrete particles define a particle having a maximum dimension of 0.01 μm to 30 μm. In some embodiments, at least ninety percent (90%) of the plurality of discrete particles define a particle having an aspect ratio that is greater than ten (10) (i.e., an aspect ratio defined as length to diameter, such that the discrete particles are rod-like). In some embodiments, at least ninety percent (90%) of the plurality of discrete particles define a particle having an aspect ratio of 100 to 1,000. In some embodiments, the plurality of discrete particles (e.g., rod-like particles and/or having a fiber microstructure) are oriented such that a rod or fiber axis (e.g., a longitudinal axis) of such particles is located normal or perpendicular to a corresponding mating surface thereto to maximize contraction/shrinkage in a desired direction. For example, referring to FIG. 3, in the exemplary planetary gear 204, the solid lubricant wear resistant coating 722 applied to the flank surface 702 of the gear tooth 700 may have the rod or fiber axis of its discrete particles oriented in a direction 728 normal or perpendicular to the flank surface 702 based on engagement of the flank surface 702 with a corresponding surface of a mating gear tooth 730 of the annular gear 208.

As described above, in some embodiments, the solid lubricant wear resistant coating 722 includes a solid lubricant phase. In some embodiments, the solid lubricant phase defines a continuous phase or matrix within the solid lubricant wear resistant coating 722. In some embodiments, the solid lubricant phase comprises $WS_2$ and $MoS_2$ at a weight ratio of $WS_2$:$MoS_2$ that is 2:1 to 1:1, inclusive of endpoints.

In some embodiments, the solid lubricant wear resistant coating 722 comprises 1 wt. % to 90 wt. % of the negative thermal expansion coefficient material. In some embodiments, the solid lubricant wear resistant coating 722 comprises 1 wt. % to 100 wt. % of the negative thermal expansion coefficient material. In some embodiments, the solid lubricant wear resistant coating 722 comprises 10 wt. % to 45 wt. % of the negative thermal expansion coefficient material. In some embodiments, the solid lubricant wear resistant coating 722 comprises 25 wt. % to 40 wt. % of the negative thermal expansion coefficient material. In some embodiments, the solid lubricant wear resistant coating 722 comprises 50 wt. % to 99 wt. % of the solid lubricant phase. In some embodiments, the solid lubricant wear resistant coating 722 comprises 65 wt. % to 90 wt. % of the solid lubricant phase. In some embodiments, the solid lubricant wear resistant coating 722 comprises 60 wt. % to 75 wt. % of the solid lubricant phase. In some embodiments, the solid lubricant wear resistant coating 722 comprises 25 wt. % to 40 wt. % of the negative thermal expansion coefficient material, 25 wt. % to 40 wt. % of $MoS_2$, and 30 wt. % to 50 wt. % of $WS_2$.

In some embodiments, the solid lubricant wear resistant coating 722 has an average thickness of 1 μm to 50 μm. In some embodiments, the solid lubricant wear resistant coating 722 has an average thickness of 1 μm to 1000 μm. In some embodiments, the solid lubricant wear resistant coating 722 has an average thickness of 5 μm to 15 μm.

Thus, embodiments of the present disclosure comprise coatings having lubricating properties with a negative thermal expansion coefficient applied to various surfaces of certain components, such as gear-related components. For example, as the contact stress on the gear-related component increases, the flash temperature increases which would in turn result in contraction of a coating. In embodiments of the present disclosure, the contact stress applied on the coating gets regulated, which thereby enables the coating of the present disclosure to be both wear resistant and lubricious. Additionally, oleophilic and porous coatings are applied on load bearing areas according to the present disclosure which retain a certain quantity of lubricant. Under pressure, the coating of the present disclosure gets squeezed to release the lubricant into the contact zone. Once the coating exits the contact zone, it begins to relax and during this process, the lubricant gets absorbed back into the coating layer. Additionally, oleophobic coatings are applied to the components according to the present disclosure to conserve lubricant consumption. Accordingly, embodiments of the present disclosure provide increased performance under starved lubrication and under higher temperature rise and improved resistance to the presence of particles in lubrication sumps due to the presence of coatings.

Further aspects of the invention are provided by the subject matter of the following clauses:

A coated component, comprising: a component having a surface; and a solid lubricant wear resistant coating on the surface; wherein the solid lubricant wear resistant coating includes a solid lubricant phase with a negative thermal expansion coefficient material dispersed therein.

The coated component of the preceding clause, wherein the solid lubricant wear resistant coating is configured to contract 0.005% to 0.1% of its room temperature thickness on the surface of the component at an operating temperature of 300° ° C.

The coated component of any preceding clause, wherein the solid lubricant wear resistant coating has a room temperature thickness of 25 μm to 1000 μm, and wherein the solid lubricant wear resistant coating has an operating thickness that is 0.001% to 0.064% of the room temperature thickness at an operating temperature of 200° ° C.

The coated component of any preceding clause, wherein the solid lubricant phase comprises $WS_2$, $MoS_2$, a diamond-like carbon material, chromium, or a mixture thereof.

The coated component of any preceding clause, wherein the solid lubricant phase comprises $WS_2$, $MoS_2$, or a mixture thereof.

The coated component of any preceding clause, wherein the solid lubricant phase comprises $WS_2$ and $MoS_2$.

The coated component of any preceding clause, wherein the negative thermal expansion coefficient material comprises a compound of a formula: $Zr_{1-x}Hf_xW_{2-y}Mo_yO_8$, where x is 0 to 1 and where y is 0 to 2.

The coated component of any preceding clause, wherein the negative thermal expansion coefficient material comprises a compound of a formula: $Zr_{1-x}Hf_xW_2O_8$, where x is 0 to 1.

The coated component of any preceding clause, wherein the negative thermal expansion coefficient material comprises a compound of a formula: $Zr_{1-x}Hf_xMo_2O_8$, where x is 0 to 1.

The coated component of any preceding clause, wherein the negative thermal expansion coefficient material comprises a compound of a formula: $Zr_{1-x}Hf_xWMoO_8$, where x is 0 to 1.

The coated component of any preceding clause, where x is 0 such that the negative thermal expansion coefficient material comprises a compound of a formula: $ZrW_{2-y}Mo_yO_8$, where y is 0 to 2.

The coated component of any preceding clause, where x is 1 such that the negative thermal expansion coefficient material comprises a compound of a formula: $HfW_{2-y}Mo_yO_8$, where y is 0 to 2.

The coated component of any preceding clause, where x is 0.1 to 0.5.

The coated component of any preceding clause, wherein the negative thermal expansion coefficient material defines a plurality of discrete particles within the solid lubricant wear resistant coating.

The coated component of any preceding clause, wherein at least 90% of the plurality of discrete particles define a particle having a maximum dimension of 0.01 μm to 30 μm.

The coated component of any preceding clause, wherein at least 90% of the plurality of discrete particles define a particle having an aspect ratio that is greater than 10.

The coated component of any preceding clause, wherein at least 90% of the plurality of discrete particles define a particle having an aspect ratio of 100 to 1,000.

The coated component of any preceding clause, wherein an axis of at least a portion of the plurality of discrete particles is oriented perpendicular to a mating surface of another component.

The coated component of any preceding clause, wherein the solid lubricant phase defines a continuous phase within the solid lubricant wear resistant coating.

The coated component of any preceding clause, wherein the solid lubricant phase comprises $WS_2$ and $MoS_2$ at a weight ratio of $WS_2:MoS_2$ that is 2:1 to 1:1.

The coated component of any preceding clause, wherein the solid lubricant wear resistant coating comprises 1 wt. % to 90 wt. % of the negative thermal expansion coefficient material.

The coated component of any preceding clause, wherein the solid lubricant wear resistant coating comprises 1 wt. % to 100 wt. % of the negative thermal expansion coefficient material.

The coated component of any preceding clause, wherein the solid lubricant wear resistant coating comprises 10 wt. % to 45 wt. % of the negative thermal expansion coefficient material.

The coated component of any preceding clause, wherein the solid lubricant wear resistant coating comprises 25 wt. % to 40 wt. % of the negative thermal expansion coefficient material.

The coated component of any preceding clause, wherein the solid lubricant wear resistant coating comprises 50 wt. % to 99 wt. % of the solid lubricant phase.

The coated component of any preceding clause, wherein the solid lubricant wear resistant coating comprises 65 wt. % to 90 wt. % of the solid lubricant phase.

The coated component of any preceding clause, wherein the solid lubricant wear resistant coating comprises 60 wt. % to 75 wt. % of the solid lubricant phase.

The coated component of any preceding clause, wherein the solid lubricant wear resistant coating comprises 25 wt. % to 40 wt. % of the negative thermal expansion coefficient material, 25 wt. % to 40 wt. % of $MoS_2$, and 30 wt. % to 50 wt. % of $WS_2$.

The coated component of any preceding clause, wherein the solid lubricant wear resistant coating has an average thickness on the surface of 1 μm to 1000 μm.

The coated component of any preceding clause, wherein the solid lubricant wear resistant coating has an average thickness on the surface of 5 μm to 15 μm.

A coated component, comprising: a component having a surface; and a solid lubricant wear resistant coating on the surface, wherein the solid lubricant wear resistant coating includes a solid lubricant phase with a negative thermal expansion coefficient material dispersed therein.

The coated component of any preceding clause, wherein the component has a plurality of teeth, each tooth having a top land surface and at least one flank surface, wherein the solid lubricant wear resistant coating is on the at least one flank surface of each tooth.

The coated component of any preceding clause, wherein the solid lubricant wear resistant coating covers at least 90% of a surface area of the at least one flank surface of each tooth.

The coated component of any preceding clause, wherein the top land surface of each tooth of the plurality of teeth is substantially free from the solid lubricant wear resistant coating.

The coated component of any preceding clause, wherein a coating having oleophilic properties is disposed on the top land surface of each tooth of the plurality of teeth.

The coated component of any preceding clause, wherein the solid lubricant wear resistant coating has a thickness of 25 μm to 1000 μm.

The coated component of any preceding clause, wherein the component is a roller bearing cage defining apertures therein, wherein the solid lubricant wear resistant coating is positioned on surfaces defining the apertures such that the solid lubricant wear resistant coating is positioned to contact a bearing when positioned within the roller bearing cage.

The coated component of any preceding clause, wherein the component is an outer ring of a planetary gear, and wherein the solid lubricant wear resistant coating is on a surface of the outer ring such that the solid lubricant wear resistant coating contacts a bearing when positioned therein.

The coated component of any preceding clause, wherein the component is an inner ring of a planetary gear, and wherein the solid lubricant wear resistant coating is on a surface of the inner ring such that the solid lubricant wear resistant coating contacts a bearing when positioned therein.

A coated component, comprising: a component having a plurality of teeth and a plurality of bottom land surfaces alternatively arranged such that each tooth is positioned between a pair of bottom land surfaces and each bottom land surface is positioned between a pair of teeth, wherein each tooth has a top land surface and at least one flank surface; and a coating having oleophilic properties is disposed over at least a portion of the at least one flank surface.

The coated component of any preceding clause, wherein the coating having oleophilic properties is over each of the plurality of bottom land surfaces.

The coated component of any preceding clause, wherein the coating having oleophilic properties comprises graphene oxide, boron nitride, or a mixture thereof.

The coated component of any preceding clause, wherein the coating having oleophilic properties comprises a hexagonal boron nitride coating.

The coated component of any preceding clause, wherein the coating having oleophilic properties comprises carbon nanotubes dispersed within the coating having oleophilic properties.

A coated component, comprising: a component having a plurality of teeth and a plurality of bottom land surfaces alternatively arranged such that each tooth is positioned between a pair of bottom land surfaces and each bottom land surface is positioned between a pair of teeth, wherein each tooth has a top land surface and at least one flank surface, and wherein the component has a plurality of end face surfaces; and a coating having oleophobic properties over the plurality of end face surfaces.

The coated component of any preceding clause, wherein the coating having oleophobic properties comprises a diamond-like carbon, a $SiO_2$ dispersed coating, a PTFE-based coating, or a mixture thereof.

The coated component of any preceding clause, wherein the coating having oleophobic properties has a thickness of 1 μm to 1000 μm.

A coated component, comprising: a component having a plurality of teeth and a plurality of bottom land surfaces alternatively arranged such that each tooth is positioned between a pair of bottom land surfaces and each bottom land surface is positioned between a pair of teeth, wherein each tooth has a top land surface and at least one flank surface; and a coating having porous properties over at least a portion of the at least one flank surface.

The coated component of any preceding clause, wherein the coating having porous properties is over each of the plurality of bottom land surfaces.

The coated component of any preceding clause, wherein the coating having porous properties comprises aluminosilicates.

The coated component of any preceding clause, wherein the coating having porous properties comprises an iron doped aluminosilicate.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A coated component, comprising:
a component having a surface; and
a solid lubricant wear resistant coating on the surface, wherein the solid lubricant wear resistant coating includes a solid lubricant phase with a negative thermal expansion coefficient material dispersed therein, wherein the solid lubricant wear resistant coating is configured to contract 0.005% to 0.1% of its room temperature thickness on the surface of the component at an operating temperature of 300° C.

2. The coated component of claim 1, wherein the solid lubricant wear resistant coating has a room temperature thickness of 25 μm to 1000 μm.

3. The coated component of claim 1, wherein the solid lubricant phase comprises $WS_2$, $MoS_2$, a diamond-like carbon material, chromium, or a mixture thereof.

4. The coated component of claim 1, wherein the solid lubricant phase comprises $WS_2$, $MoS_2$, or a mixture thereof.

5. The coated component of claim 1, wherein the solid lubricant phase comprises $WS_2$ and $MoS_2$.

6. The coated component of claim 1, wherein the negative thermal expansion coefficient material comprises a compound of a formula:

$$Zr_{1-x}Hf_xW_{2-y}Mo_yO_8$$

where x is 0 to 1 and where y is 0 to 2.

7. The coated component of claim 1, wherein the negative thermal expansion coefficient material comprises a compound of a formula:

$$Zr_{1-x}Hf_xW_2O_8$$

where x is 0 to 1.

8. The coated component of claim 1, wherein the negative thermal expansion coefficient material comprises a compound of a formula:

$$Zr_{1-x}Hf_xMo_2O_8$$

where x is 0 to 1.

9. The coated component of claim 1, wherein the negative thermal expansion coefficient material comprises a compound of a formula:

$$Zr_{1-x}Hf_xWMoO_8$$

where x is 0 to 1.

10. The coated component of claim 9, where x is 0 such that the negative thermal expansion coefficient material comprises a compound of a formula:

$$ZrW_{2-y}Mo_yO_8$$

where y is 0 to 2.

11. The coated component of claim 1, where x is 1 such that the negative thermal expansion coefficient material comprises a compound of a formula:

$$HfW_{2-y}Mo_yO_8$$

where y is 0 to 2.

12. The coated component of claim 11, where x is 0.1 to 0.5.

13. The coated component of claim 1, wherein the negative thermal expansion coefficient material defines a plurality of discrete particles within the solid lubricant wear resistant coating.

14. The coated component of claim 13, wherein at least 90% of the plurality of discrete particles define a particle having a maximum dimension of 0.01 μm to 30 μm.

15. The coated component of claim 13, wherein at least 90% of the plurality of discrete particles define a particle having an aspect ratio that is greater than 10.

16. The coated component of claim 13, wherein at least 90% of the plurality of discrete particles define a particle having an aspect ratio of 100 to 1,000.

17. The coated component of claim 15, wherein an axis of at least a portion of the plurality of discrete particles is oriented perpendicular to a mating surface of another component.

18. The coated component of claim 1, wherein the solid lubricant phase defines a continuous phase within the solid lubricant wear resistant coating.

19. The coated component of claim 1, wherein the solid lubricant phase comprises $WS_2$ and $MoS_2$ at a weight ratio of $WS_2:MoS_2$ that is 2:1 to 1:1.

* * * * *